Jan. 22, 1929.  A. ROHRBACH  1,699,991
HYDROAEROPLANE
Filed April 2, 1927   2 Sheets-Sheet 1
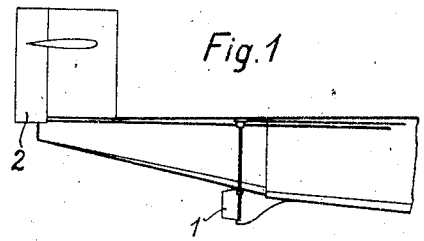
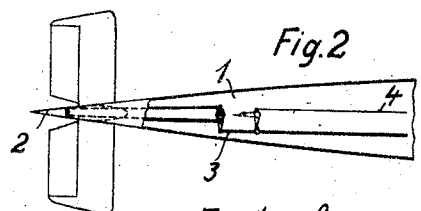
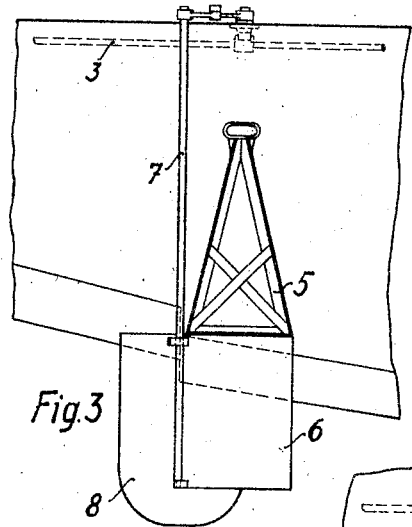
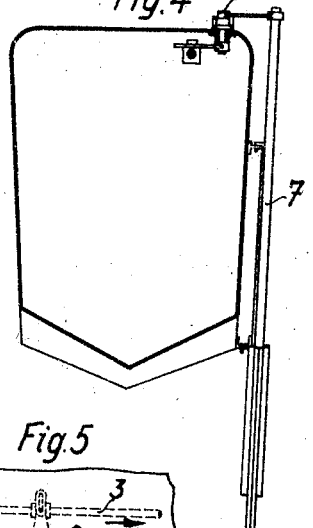
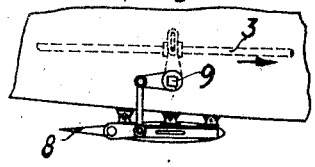
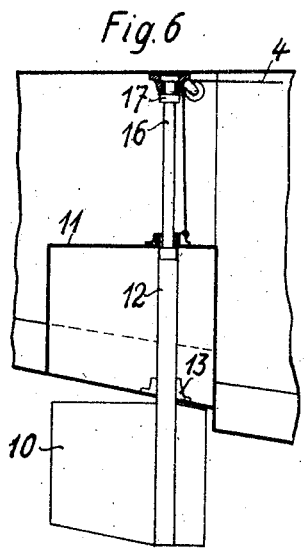
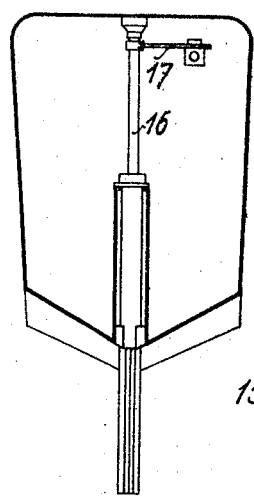
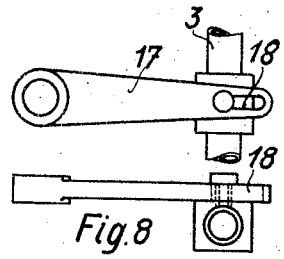
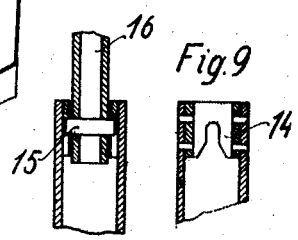

Jan. 22, 1929.　　　　　　A. ROHRBACH　　　　　　1,699,991
HYDROAEROPLANE
Filed April 2, 1927　　　2 Sheets-Sheet 2

Patented Jan. 22, 1929.

1,699,991

UNITED STATES PATENT OFFICE.

ADOLF ROHRBACH, OF BERLIN-WILMERSDORF, GERMANY.

HYDROAEROPLANE.

Application filed April 2, 1927, Serial No. 180,383, and in Germany April 8, 1926.

The invention relates to hydroaeroplanes.

In order to obtain increased controllability of hydroaeroplanes taxying on the water, it has been proposed to use water-rudders, which can be either permanently joined to the vertical control surfaces of the plane, or controlled separately. One objection to the first mentioned permanent connection of water-rudder and vertical control surfaces is that the pilot, with the rather high starting and landing speeds of the machine, is able with difficulty to operate the rudder and the vertical control surfaces with same, owing to the water-rudder being very highly stressed. In contradistinction hereto the separately controlled water-rudder requires a special attendant, which means that its practical use depends on the available number of crew of the craft.

The present invention relates to a hydroaeroplane provided with separately arranged air rudder and water-rudder, said arrangement permitting, however, by means of a readily engageable and disengageable coupling between the water-rudder and the regulating or operating device leading from the foot-levers to the vertical control surfaces (air rudder), the pilot to either control the water-rudder together with the lateral control air rudder surfaces or leave it at rest and separated from the latter. Preferably there is also provided a remote control means for the coupling between the regulating or operating device for the air rudder and the water rudder, so that the entire water-rudder controlling devices can be located inside the pilot's cockpit.

Several embodiments of the subject matter of the invention are shown, by way of example, on the accompanying drawings, wherein:

Figs. 1-2 represent two views of the hull end of a flying boat, with plan view of air rudder and water-rudder arranged according to the invention diagrammatically illustrated.

Figs. 3-5 show a specific form of construction and arrangement, in front view, side-elevation and plan view respectively.

Figs. 6-7 are views of another form of construction, in side elevation and front view.

Figs. 8-9 represent details, in two different views.

Figure 10:
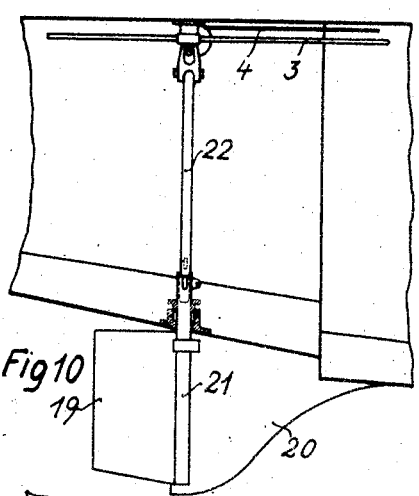
Figs. 10-12 show three main views of another form of construction.

An important feature of the invention is that the water-rudder (1) of a seaplane (Figs. 1, 2) can be temporarily operated by the controlling and operating device or means for operating the vertical rudder (2), if this seems preferable with the machine taxying on the water. For this purpose means are provided to ensure the possibility of readily engaging and disengaging the water-rudder coupling with the regulating or operating device (3) leading from the pilot's cockpit, (which does not appear on the drawing), to the vertical control surfaces or air rudder. The coupling means is preferably operated by special distance or remote control (4). These Figs. 1 and 2 show the invention more or less diagrammatically.

A simple constructional form of the invention is shown in Figs. 3-5, wherein the water-rudder is characterized as a special device to be suspended outboards to the side of the craft. The rudder unit consists of a frame (5) provided with hook and handle, the lower part of which ends in a false rudder or board (6), which in practice forms a keel-shaped fixed plane. The rudder-axle (7) with suspended rudder (8) is attached to the trailing edge of the said false rudder. The axle 7 extends to or above the level of the air rudder operating device 3. The upper end of the axle (7) is connected by pivoting levers and connecting link to the pivot (9), this latter being operated by the regulating or operating device (3) through the slotted lever-pin mechanism indicated. The joint of the lever-hinges and the pivot (9) is easily detachable, as for example by the rectangular shaping of the pivot end, on which the corresponding hinge-lever is simply slipped upon suspending the rudder unit.

The water-rudder is used in such way, that in case of emergency the frame (5) is hung by means of its hooks into the outboard rings, thereby gearing the same to the hinge and pivot (9). Pulling the regulating device (3) in the direction of the arrow, or in the contrary sense, shall cause the water-rudder, which is suitably balanced, to swing back. As shown clearly in Fig. 2, the vertical or air rudder (2) is moving in the same sense at the same time, so that the effect of the one rudder serves as supplement to that of the other. As soon as the machine takes off the water proceeding on her way through the air, the rudder unit can be detached and stowed away inside the craft. The pivot (9) is, in the latter case, running dead when the vertical control surfaces are alone actioned operated.

It is, for instance, possible to disengage the water-rudder from the regulating device without detaching the former, by so arranging the pivot (9), that it can be axially shifted, and providing a connecting rope to the cockpit where the pilot, by simply pulling said rope, is in a position to disengage regulating device (3) and rudder axle.

According to the second form of construction (Figs. 6-9) a suspended rudder (10) can, in case of non-use, be pulled up into a separate room or chamber (11) of the aircraft, which is open towards the water side. The lower tube-shaped part (12) of the bi-partite rudder carries the rudder proper and is supported in two bearings, the one of which is arranged at the bottom and consists of two parallel parts or sectors with gaps of enough width to allow the passing through of the rudder (10). The upper part of the tube (12) is interconnected with a rope pulley (4) leading to the pilot's cockpit and includes an inner slotted socket or sleeve (14) (Fig. 9) which slot accommodates the transverse coupling pin (15) on the lower end of the upper part (16) of the rudder axle, when the rudder (10) is lowered. When let down, the rudder is supported by part 16 and pin 15, which can not be axially shifted being permanently connected with the regulating device (3) through the levers 17. Part 3 and lever 17 are coupled by sliding bolt and hole (18).

If the pilot wants to use the rudder for proceeding on the water, he has to release the rope 4, so that the weight of the rudder (10) pulls same out of the chamber or pocket (11). The rudder is thus automatically coupled with axle part (16) whch is continually operated in unison with the vertical control surfaces, pin (15) entering the slot of socket (14). In order to take in the water rudder, the pilot has but to pull up the rudder into the chamber by means of the rope (4), same action causing disengagement of the rudder. The regulating device 3 and the water rudder are connected and disconnected with the vertical control surfaces 2 at zero position.

Figure 11:
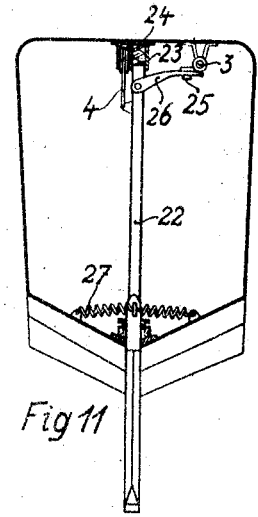
Figure 12:
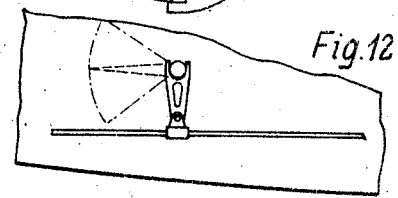
Figure 13:
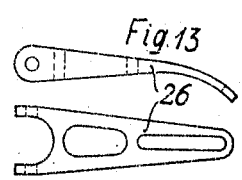
Fig. 13 is a detail represented in side elevation and plan view.

The third form of construction according to Figs. 10-13 shows the water rudder (19) being permanently arranged behind a false rudder (20). This latter forms, together with the boat bottom, a bearing for the lower part (21) of a bi-partite axle, the upper part (22) of which is arranged inside the tube-shaped part (21) and a cap (23), so as to be axially displaceable by a short distance. This displacement causes engagement or disengagement of the two axle parts provided with coupling pin and slot. Axle part (22) is connected with the pilot's cockpit by means of rope pulley (4), being, at the same time, under action of a spring (24) arranged in the cover cap (23) and pushing in a direction to effect the coupling. (3) is the regulating or operating device leading to the vertical control surfaces, the cam bolt (25) of which slides in the longitudinal slot of a lever (26) hinged to the upper rudder axle part (22).

When the pilot releases the rope (4), the axle part (22) is lowered under the action of the spring (24), so as to engage with the rudder (19). The hinged lever (26), guided by the pivot (25) is correspondingly displaced.

By pulling the rope the water rudder is again disengaged from the regulating device (3). In order to retain the rudder, when not used, in the central position, two springs (27) are provided inside the boat hull, which fix the disengaged rudder in the zero position.

Figure 14:
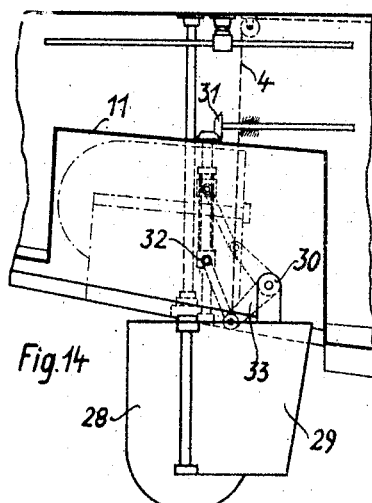
Figs. 14-16 show three main views of another form of construction.
Figure 15:
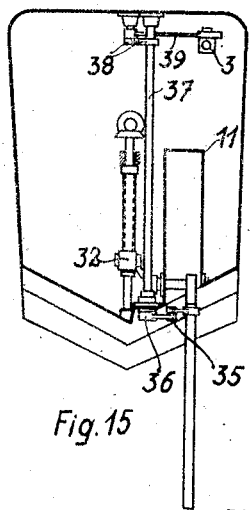
Figure 18:
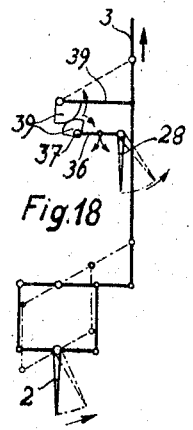
Fig. 18 is a plan view of the controlling devices according to the form of construction shown in Figs. 14-16.
Figure 16:
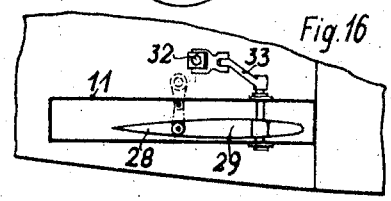
Figure 17:
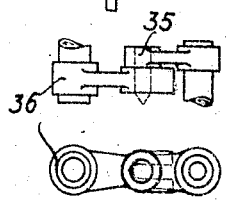
Fig. 17 shows a detail, on enlarged scale.

Figs. 14-18 show a water rudder to be pivoted on a horizontal axis from the effective position into a separate chamber (11) of the boat hull. This suspended rudder (28) is hinged to a false rudder (29), which can be pivoted about the horizontal axis (30). The pivoting means, to be actioned from the pilot's seat, consist of a bevel gear (31), working a travelling nut (32), the latter being connected with the rudder unit (28, 29) by means of a connecting rod and a lever 33 rigidly connected to the rudder unit horizontal axle 30. The rudder unit being pulled into the chamber (11), the lever (33) moves from the dotted position into the position indicated by dots and lines.

Said pivoting causes engagement or disengagement of a coupling pin (35) rigidly connected with the axle of the rudder (28), and a coupling fork (36) arranged at the lower part of an axle (37) supported inside the hull. Said axle (37) is designed to act as transmitting member, its upper end being coupled with a lever (39) attached to the regulating device (3), by means of toothed quadrants (38). As can be gathered from the control system plan view (Fig. 18) pulling at the regulating device (3) causes uniform and corresponding movement of the water rudder (28) and vertical rudder (2). Pushing action will of course, produce reversed conditions, with regard to rudder movement.

Conditions might occur requiring means to automatically pull the water rudder off the water with the aircraft developing too much speed. This can be attained, without any difficulty, with the arrangement represented in Figs. 14–16, by replacing the mechanical gear 31/32 by the indicated rope pulley (4). If, with this water rudder, being held in the water by its own weight only and which can, if desired, be intentionally loaded, the moving force becomes so efficient, that its moment surpasses the force retaining the rudder in its moving position, the rudder is automatically pivoted into the chamber and, at the same time, separated from the vertical control surfaces.

The invention can be applied to sea-going aircraft of all types.

What I claim is:

1. In a hydroaeroplane the combination of independent air and water steering devices each of which is adapted to impart to the craft lateral steering motions with means for readily connecting and disconnecting the water steering device with and from the air steering device at the will of the operator.

2. In a hydroaeroplane the combination of a vertical air rudder and means for operating the same, with a water rudder separate and distinct from the air rudder and a readily engageable and disengageable connection between the water rudder and the operating means for the air rudder.

3. In a hydroaeroplane of the character set forth in claim 1 including a remote control device which is operably connected with the means for connecting and disconnecting the water rudder with the air rudder.

4. A hydroaeroplane of the character set forth in claim 1 wherein the water steering device is disposed outboard.

5. In a hydroaeroplane the combination of a vertical tail plane, operating means for said vertical tail plane, a water rudder separate and distinct from the vertical tail plane and arranged outboard, said water rudder being attachably and detachably arranged with reference to the floating structure, and a readily detachable coupling means between the operating means for the tail plane and the water rudder for operatively connecting the water rudder with the operating means at will.

6. A hydroaeroplane of the character set forth in claim 5 wherein the water rudder is readily suspendable outboard and consists of a supporting frame with hooks arranged at the supporting frame, apertures corresponding to the hooks being provided on the vertical wall of the hull of the floating structure, the supporting frame having bearings for the water rudder and its axle, the rudder axle passing through to the height of the operating means for the tail plane and articulated levers provided between the rudder axle and the operating means for the tail plane.

7. In a hydroaeroplane the combination of a vertical air rudder or tail plane, means for operating said air rudder, a water rudder separate and distinct from the air rudder and being readily attachable and detachable to the craft and suspendable outboard, said water rudder being balanced and including a false rudder forward thereof and means for readily connecting and disconnecting the water rudder to and from the operating means for the air rudder.

8. In a hydroaeroplane of the character set forth in claim 7 wherein the axle of the water rudder extends to the level of the operating means for the air rudder, a lever at the upper end of the rudder axle, a bell crank lever pivoted on the hull structure, one arm of the bell crank being connected to the lever of the rudder axle by means of an articulated rod and the other arm of the bell crank being connected to the operating means for the air rudder.

9. In a hydroaeroplane of the character set forth in claim 7 wherein the rudder axle extends to the level of the operating means for the air rudder, a lever carried by the upper end of the rudder axle, a journal on the hull near the rudder axle, the journal being loosely connected to the operating means by a lever, the upper end of the journal being edge-shaped, a disengageable lever having a socket corresponding to the edge-shaped end of the journal and adapted to be readily slipped over the latter, an articulated arm between the disengageable lever and the lever of the rudder axle and the disengageable lever being mountable and demountable with the rudder.

10. In a hydroaeroplane, a water rudder unit which is readily suspendable outboard including a frame in which the rudder is journalled with means thereon for ready suspension from the side of the floating structure, operating means for the rudder, and coupling devices between the rudder and the operating means which are engageable upon suspension of the rudder unit to side of floating structure.

11. In a hydroaeroplane, a water rudder unit which is readily suspendable therefrom including a frame in which the rudder is journalled, operating means for the rudder, and coupling devices between the rudder and the operating means which are engageable upon suspension of the rudder unit.

12. In a hydroaeroplane the combination of an air rudder and a water rudder with means and connections for readily either operating them simultaneously and in unison, or disconnecting and rendering the water rudder inoperative and operating the air rudder alone while the water rudder is totally disconnected therefrom.

13. In a hydroaeroplane, an air rudder, a water rudder, a coupling means between the water rudder and the air rudder which is operable by axial movement of the rudder axle, and means for operating said rudders.

14. In a control for hydroaeroplane of the character set forth in claim 1 wherein the water steering device is detachably connected with the control elements running from the pilot's cockpit to the air rudder.

15. In a control mechanism of the character set forth in claim 2, wherein the operating means for the air rudder includes a remote control leading to the pilot's cockpit, the water rudder being detachably connected with said remote control.

16. In a control mechanism of the character set forth in claim 12 wherein the operating means for the air rudder includes a remote control leading to the pilot's cockpit and the water rudder is detachably connected with said remote control devices.

In testimony whereof, I have signed my name to this specification.

ADOLF ROHRBACH.